(12) United States Patent
Long

(10) Patent No.: US 11,673,499 B2
(45) Date of Patent: Jun. 13, 2023

(54) AUXILIARY FUNCTION BOARD OF VEHICLE SEATS

(71) Applicant: Fang Long, Guangdong (CN)

(72) Inventor: Fang Long, Guangdong (CN)

(73) Assignee: Shenzhen Longxin industrial Co., Ltd., Shenzhen (CN)

( * ) Notice: Subject to any disclaimer, the term of this patent is extended or adjusted under 35 U.S.C. 154(b) by 1 day.

(21) Appl. No.: 17/464,710

(22) Filed: Sep. 2, 2021

(65) Prior Publication Data

US 2023/0048105 A1 Feb. 16, 2023

(30) Foreign Application Priority Data

Aug. 11, 2021 (CN) .......................... 202121882502.3
Aug. 11, 2021 (CN) .......................... 202121891531.6

(51) Int. Cl.
*B60N 3/00* (2006.01)
(52) U.S. Cl.
CPC .................................... *B60N 3/002* (2013.01)
(58) Field of Classification Search
CPC .......... A47C 7/70; A47C 7/705; B60N 3/004; B60N 3/001; B60N 3/002; B64D 11/0638
USPC ....................... 108/152, 44, 47; 297/146, 163
See application file for complete search history.

(56) References Cited

U.S. PATENT DOCUMENTS

| | | | | |
|---|---|---|---|---|
| 2,649,972 A * | 8/1953 | Weil | .......................... | A47F 5/13 108/147.11 |
| 2,687,336 A * | 8/1954 | Smith | .................... | B60N 3/004 108/34 |
| 3,899,982 A * | 8/1975 | Fetzek | .................... | A47B 31/06 312/246 |
| 5,092,652 A * | 3/1992 | Macaluso | .............. | A47B 13/16 108/26 |
| 5,370,060 A * | 12/1994 | Wang | ..................... | B60N 3/004 297/163 |
| 5,653,178 A * | 8/1997 | Huczka | ................ | A47B 96/067 108/135 |
| 6,494,148 B1 * | 12/2002 | Mullaney | ............... | B60N 3/005 108/47 |
| 7,448,688 B2 * | 11/2008 | Farah | ..................... | A47C 16/02 297/217.7 |
| 7,739,964 B2 * | 6/2010 | Hatton | ................... | F16M 13/02 108/135 |
| 8,857,347 B1 * | 10/2014 | Liu | .......................... | A47B 5/02 108/47 |

(Continued)

FOREIGN PATENT DOCUMENTS

WO WO-2009040079 A2 * 4/2009 ............. B60N 3/004

*Primary Examiner* — Jose V Chen

(57) ABSTRACT

An auxiliary function board of vehicle seats, comprising a device main body, wherein the device main body comprises a bottom plate and a supporting plate mounted on the bottom plate in a pull-out manner; the upper end of the supporting plate forms a horizontal placement surface, and the upper end of the bottom plate is provided with a boss on the side away from the supporting plate; a backing plate is mounted on the boss in an overturning manner; a pull-out plate is inserted from top to bottom on the backing plate; the pull-out plate is provided with a fixing device; the whole device main body is fixedly installed on the two metal rods on the seat back through the fixing device; at least two placing cavities of arbitrary shapes are formed on the bottom plate protruding from one end of the supporting plate.

18 Claims, 12 Drawing Sheets

(56) References Cited

U.S. PATENT DOCUMENTS

| | | | | |
|---|---|---|---|---|
| 2003/0038514 A1* | 2/2003 | Johnston | ............... | B60N 2/20 |
| | | | | 297/188.04 |
| 2011/0155024 A1* | 6/2011 | McCaffrey | ............ | B60N 3/004 |
| | | | | 108/26 |
| 2015/0061327 A1* | 3/2015 | Millan | .................. | B60N 3/004 |
| | | | | 297/163 |
| 2022/0324364 A1* | 10/2022 | Hill | ....................... | B60R 7/043 |

* cited by examiner

AUXILIARY FUNCTION BOARD OF VEHICLE SEATS

BACKGROUND OF THE INVENTION

1. Field of the Invention

The invention relates to a vehicle-mounted auxiliary component, in particular to an auxiliary function board of vehicle seats.

2. Description of the Related Art

When we travel, we sit in the back of the vehicle, and often encounter situations where we need to work, rest, and entertain; for example, the office supplies, drinking cups, entertainment equipment, etc. in our hands cannot be placed, and there are many shortcomings. In order to solve the above problems, the traditional method is to set a board on the back of the backrest, which can be used as a simple place for objects and rest. The most common is the backrest behind the seat of the bullet train, but this kind of backrest has a single function and cannot be adjusted according to actual needs. There are many drawbacks when using it.

SUMMARY OF THE INVENTION

The technical problem to be solved by the invention is to provide an auxiliary function board of vehicle seats, which can be easily folded and carried, has a small size, is suitable for any vehicles, is convenient for rear passengers, and greatly increases the overall function, which makes it meet a series of needs of passengers while riding, has higher flexibility in use, improves passenger satisfaction, and facilitates passengers' travel.

The invention is realized by the following technical solutions: an auxiliary function board of vehicle seats, comprising a device main body, wherein the device main body comprises a bottom plate and a supporting plate mounted on the bottom plate in a pull-out manner; the upper end of the supporting plate forms a horizontal placement surface, and the upper end of the bottom plate is provided with a boss on the side away from the supporting plate; a backing plate is mounted on the boss in an overturning manner; a pull-out plate is inserted from top to bottom on the backing plate; the pull-out plate is provided with a fixing device; the whole device main body is fixedly installed on the two metal rods on the seat back through the fixing device; at least two placing cavities of arbitrary shapes are formed on the bottom plate protruding from one end of the supporting plate, and one of the placing cavities is provided with a foldable storage type fixing bracket; a functional clamping assembly is rotatably provided on the side of the backing plate opposite to the bottom plate; supporting abutments are also provided on the end surface of the bottom plate on the side facing away from the supporting plate; the supporting abutments are mounted in the bottom plate in a pull-out manner, and after being pulled out, they contact and support the back of the seat back.

Preferably, the fixing device comprises a fixing bottom shell and a fixing surface shell; the fixing bottom shell and the fixing surface shell are locked together by screws; the fixing bottom shell is telescopically installed with a movable clamping arm, and the bottom of the fixing surface shell is provided with a fixed clamping arm corresponding to the movable clamping arm; one side of the fixing bottom shell is hinged with a compression arm, and the compression arm is pressed against the side of the movable clamping arm; the two sides of the fixed clamping arm and the movable clamping arm respectively extend to the outside of the fixing bottom shell and the fixing surface shell, and the protruding ends respectively form a locking hook for locking the two metal rods on the seat back.

Preferably, the compression arm is provided with a first comb tooth layer on the side opposite to the movable clamping arm; a second comb tooth layer is provided on the movable clamping arm facing the first comb tooth layer; the first comb tooth layer and the second comb tooth layer are compressed and positioned by elastic pressing force; the back of the compression arm is provided with a spring positioning hole, and a spring positioning column is protrudingly provided on the fixing bottom shell facing the spring positioning hole; one end of a first spring is inserted into the spring positioning hole, and the other end is positioned and installed on the spring positioning column; the compression arm is pressed against the movable clamping arm through the first spring; one end of the compression arm is provided with a rotating shaft sleeve, and the rotating shaft sleeve is rotatably installed between the fixing surface shell and the fixing bottom shell; the top of the compression arm is provided with a toggle key; a key slot hole is opened on the fixing surface shell facing the toggle key; the toggle key passes through the key slot hole and protrudes to the outside; the first spring is arranged on the side close to the toggle key.

Preferably, the upper end surface of the movable clamping arm is provided with a guide rail groove; the upper end surface of the fixing surface shell is provided with a guide limiter at a position facing the guide rail groove; the guide limiter is buckled into the guide rail groove; the guide limiter ensures that the movable clamping arm can be pulled out more smoothly and can move along the guide rail groove.

Preferably, an extension convex part is provided on the fixing bottom shell and the fixing surface shell; an assembly concave part is provided on the pull-out plate facing the extension convex part; a connecting piece is formed on the pull-out plates on both sides of the assembly concave part; the middle of the connecting piece is provided with a through hole; a fixing nut is provided in the extension convex part; a locking piece is provided on both outsides of the connecting piece, and the locking piece comprises a knob part and a screw; the screw passes through the through hole and extends into the extension convex part to be in threaded connection with the fixing nut; the angle between the fixing device and the pull-out plate is positioned by the locking piece; the fixing nut is loosened during operation, and the fixing nut is tightened after the position required by the angle value is adjusted.

Preferably, the functional clamping assembly comprises a rotating disc; a central shaft is provided on the rotating disc; the rotating disc is rotatably installed on the backing plate through the central shaft; one side of the rotating disc is opened with an opening groove; a pull-out part is installed in the opening groove; the pull-out part is hinged with a first fixing clip; the rotating disc on one side of the first fixing clip is provided with a first receiving groove; the rotating disc arranged symmetrically with the first fixing clip is provided with a second fixing clip and a second receiving groove; the second fixing clip is hinged in the second receiving groove through a hinge shaft; the first fixing clip and the second fixing clip are respectively buckled into the first receiving groove and the second receiving groove for receiving.

Preferably, a finger buckle groove is formed on one side of the first receiving groove and the second receiving groove; the pull-out is connected with two pull-out rods; the pull-out rods are installed in the pull-out holes in the rotating disc in a pull-out manner; the tail end of the pull-out rod is provided with a limiting convex part; the pull-out rod is fitted with a second spring; one end of the second spring is in contact with the limiting convex part, and the other end thereof is in contact with the limiting edge covering of the opening end of the pull-out hole.

The bottom plate comprises a bottom plate bottom shell and a bottom plate surface shell; the bottom plate bottom shell and the bottom plate bottom shell are fixed to each other by screws; the bottom plate bottom shell is provided with a supporting boss; the supporting boss is provided with two half-moon supporting parts; each of the half-moon supporting parts is provided with an arc-shaped supporting groove; a rotating shaft on both sides of the bottom of the backing plate is respectively provided with an annular groove; the rotating shaft is rotatably supported in the arc-shaped supporting groove through the annular groove; an inclined supporting surface is formed between one side of the backing plate and the surface of the boss; when the backing plate is in contact with one side of the boss, the angle between the backing plate and the horizontal plane is greater than 90 degrees.

Preferably, the backing plate comprises a backing plate bottom shell and a backing plate surface shell; the backing plate bottom shell and the backing plate surface shell are assembled as one by screws; the pull-out plate partially extends into the first pull-out cavity between the backing plate bottom shell and the backing plate surface shell; a locking nut is provided in the pull-out plate; a first slide rail groove is opened on the backing plate bottom shell; a locking fixture is provided outside the backing plate bottom shell; the locking screw of the locking fixture passes through the first slide rail groove and is in threaded engagement with the locking nut on the pull-out plate; a second slide rail groove is provided on the pull-out plate; a limiting convex column is provided on the backing plate bottom shell facing the second slide rail groove; the limiting convex column is buckled into the second slide rail groove; a sliding positioning structure is also provided on one side of the pull-out plate and the backing plate bottom shell.

Preferably, the sliding positioning structure comprises a third comb tooth layer arranged on the inner surface of the backing plate bottom shell and a fourth comb tooth layer arranged on the pull-out plate; the third comb tooth layer and the fourth comb tooth layer are in contact and meshing; the third comb tooth layer and the fourth comb tooth layer are compressed and contacted with each other through the locking between the locking screw and the locking nut.

Preferably, the supporting abutment comprises a supporting piece and a widened part provided on the supporting piece; the upper end surface of the supporting piece is provided with more than one positioning grooves at equal distances; the upper end of the bottom plate away from the side of the supporting plate is provided with a toggle limiter; the bottom of the toggle limiter is provided with a positioning plate; the positioning plate is positioned in the positioning groove; the toggle limiter is provided with a rotating pin; the rotating pin is rotatably installed in the limiter installation groove provided on the bottom plate.

The widened part and the supporting piece are connected by a rotating ball; one end of the rotating ball is connected to the supporting piece; a rotating cavity with the same shape as the rotating ball is provided in the widened part; a horizontal plane is respectively provided on both sides of the rotating ball.

Preferably, the fixing bracket comprises a bracket rod and a fixing sleeve with elastic force; the bottom of the fixing sleeve is provided with a mounting slot; one end of the bracket rod is installed in the mounting slot through the rotation of the pin shaft; an opening is opened on the fixing sleeve facing the bracket rod; the fixing sleeve is provided with a clamping cavity; the inner wall of the fixing sleeve is provided with more than one arc-shaped clamping groove; the bottom of the bracket rod is hinged on the bottom plate on the side of the placing cavity; the bracket rod and the fixing sleeve are buckled into the placing cavity by folding the bracket rod and the fixing sleeve.

Preferably, the supporting plate comprises a supporting plate bottom plate and a supporting plate surface plate; the supporting plate bottom plate and the supporting plate surface plate are locked together by screws, and a second pull-out cavity is formed therein; the bottom plate is mounted in the second pull-out cavity in a pull-out manner; the bottom of the supporting plate surface plate is provided with more than one guide sliding blocks; a corresponding guide sliding groove is provided on the bottom plate facing the guide sliding block; the guide sliding block slides into the guide sliding groove; the bottom plate is further provided with a limiting buckle at one end protruding from the outside of the supporting plate; the bottom of the limiting buckle is provided with a supporting spring; the supporting spring pushes the limiting buckle outwards and restricts the side of the supporting plate.

Preferably, an extension supporting plate is respectively formed on both ends of the supporting plate away from the pull-out plate.

Preferably, the upper end surface of the bottom plate is further provided with a first placement groove; the first placement groove is located between the two placing cavities; a second placement groove is further provided on the bottom plate located on one side of the first placement groove.

Preferably, the fixing device is provided with a guide block; the guide block is provided with a U-shaped cavity; a limiting stabilization block is rotatably installed in the U-shaped cavity; the limiting stabilization block is provided with a limiting stabilization part; the limiting stabilization part is in "T" shape; a limiting buckle groove is provided on the end surface of the supporting plate on the side away from the boss; a limiting piece is provided in the limiting buckle groove; the limiting piece moves left and right in the limiting buckle groove to fix the limiting stabilization part buckled into the limiting buckle groove.

Preferably, the limiting piece comprises a limiting body part; the outer end of the limiting body part forms a toggle part with a convex edge; an elastic fastener is provided on the side of the limiting body part away from the toggle part; an arc-shaped limiting part is provided on the elastic fastener; an arc-shaped limiting groove is formed on the bottom plate of the supporting plate; the arc-shaped limiting part on the elastic fastener is buckled into the arc-shaped limiting groove; the limiting body part is provided with a U-shaped positioning groove; the U-shaped positioning groove is used for positioning the T-shaped limiting stabilization part.

Preferably, the limiting buckle groove comprises a buckle hole and a horizontal guide section; the limiting piece is slidably installed in the horizontal guide section; the T-shaped limiting stabilization part is buckled into the buckle hole and positioned by the U-shaped positioning groove on the limiting body part.

The advantageous effects of the invention are: 1. the supporting plate of the invention is provided with two arc-shaped extension supporting plates, so that when the passenger is operating on the supporting plate, he can contact with hands, which is more in line with ergonomics;

2. the invention is provided with at least two placing cavities, and a fixing bracket can be provided in the placing cavity to fix a series of column-shaped pieces such as tea cups;

3. the supporting plate of the invention can be pulled out, and the length can be adjusted according to the needs; the supporting plate can be used for office or rest, etc;

4. digital products such as tablets can be placed in the placement groove of the invention, and the backing plate is used as the back support, which is convenient for the user to use digital products, and is convenient for office and entertainment;

5. the mobile phone or tablet can be clamped on the functional clamping assembly of the invention; the functional clamping assembly can be rotated at any angle, and can be adjusted according to the size of the product, so the invention has a wide range of use, and is convenient for entertainment operations;

6. the invention adopts a fixing device, which can be adjusted arbitrarily according to the distance between the metal rods of the vehicle seat; therefore, it can be installed on any vehicle seat, the installation is more flexible, and it can be fitted with the supporting abutments to make the whole device more stable when it is fixed on the back of the vehicle seat;

7. the invention is adjustable in height, foldable for storage, has a small volume after storage, is convenient to carry and install, and the overall use function is greatly improved.

BRIEF DESCRIPTION OF THE DRAWINGS

In order to explain the embodiments of the invention or the technical solutions in the prior art more clearly, the drawings that need to be used in the description of the embodiments or the prior art will be briefly introduced hereinafter. Obviously, the drawings in the following description are only some embodiments of the invention. For those of ordinary skill in the art, other drawings can be obtained based on these drawings without creative efforts.

DETAILED DESCRIPTION OF THE PREFERRED EMBODIMENTS

Figure 1:
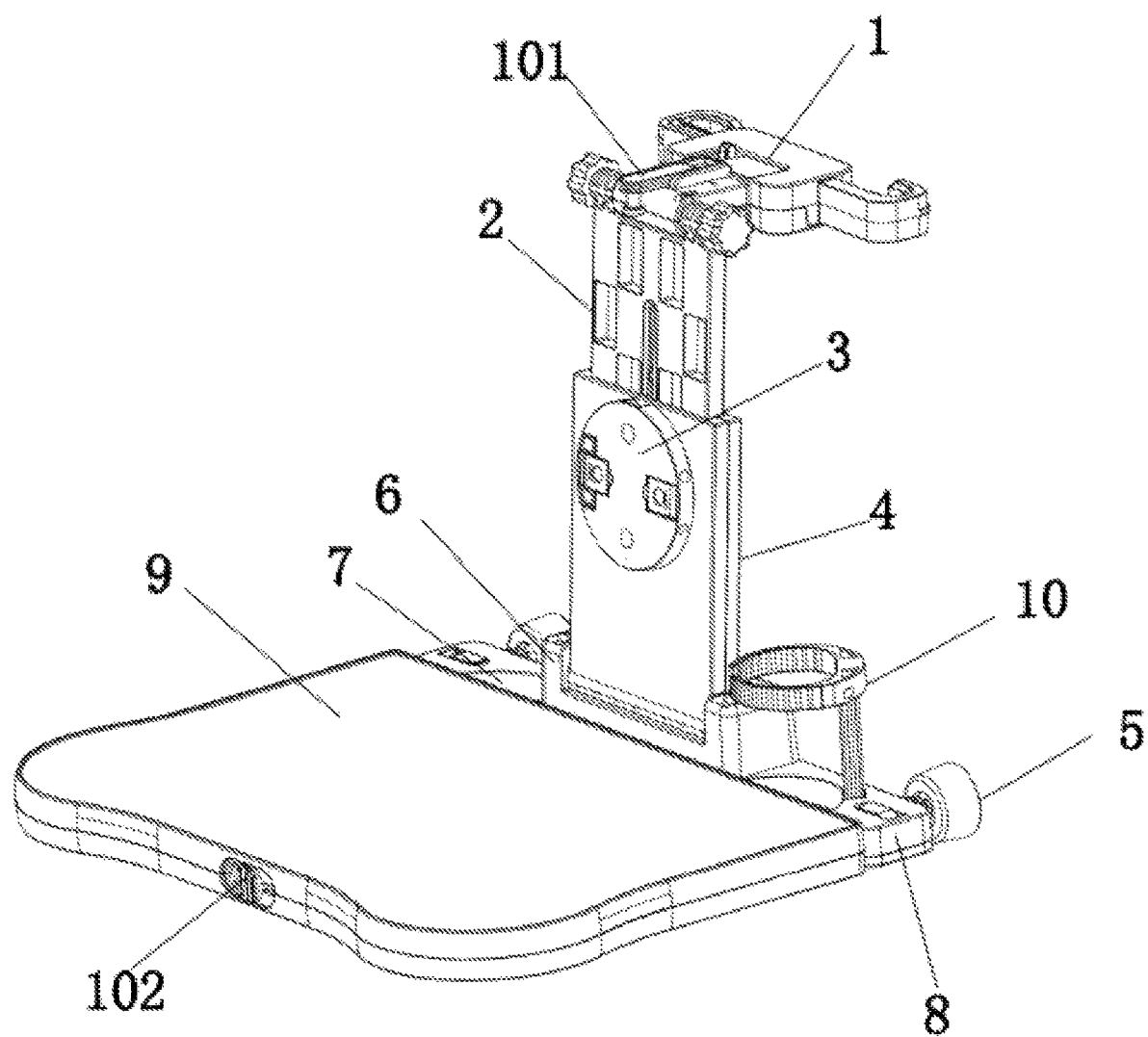
FIG. 1 is a schematic diagram of the front assembly of the invention.

All the features disclosed in the specification, or all disclosed methods or steps in the process, except for mutually exclusive features and/or steps, can be combined in any manner.

Any feature disclosed in the specification (including any appended claims, abstract and drawings), unless specifically stated, can be replaced by other equivalent or equivalent alternative features. That is, unless otherwise stated, each feature is just one example of a series of equivalent or similar features.

In the description of the invention, it needs to be understood that the orientation or positional relationship indicated by the terms "one end", "the other end", "outer", "upper", "inner", "horizontal", "coaxial", "center", "end", "length", "outer end", etc. are based on the orientation or positional relationship shown in the drawings, which are only for the convenience of describing the invention and simplifying the description, rather than indicating or implying that the device or element referred to must have a specific orientation, be constructed and operated in a specific orientation, and therefore cannot be understood as a limitation of the invention.

In addition, in the description of the invention, "plurality" means at least two, such as two, three, etc., unless otherwise specifically defined.

The terms such as "upper", "above", "lower", "below" and the like used in the invention to indicate a relative position in space are used to describe the relationship of one unit or feature relative to another unit or feature as shown in the drawings for the purpose of facilitating explanation. The term of the relative position in space may be intended to include different orientations of the device in use or operation other than those shown in the figures. For example, if the device in the figure is turned over, the unit described as being "lower" or "below" other units or features will be "above" the other units or features. Therefore, the exemplary term "below" can encompass both above and below orientations. A device can be oriented in other ways (rotated by 90 degrees or other orientations), and the space-related descriptors used in this article are explained accordingly.

In the invention, unless otherwise clearly defined and limited, the terms "provided", "sleeved", "connected", "through", "plug" and other terms should be interpreted broadly; for example, it can be a fixed connection, it can be a detachable connection, or integrated; it can be a mechanical connection or an electrical connection; it can be a direct connection, or an indirectly connection through an intermediate medium, and it can be an internal communication between two elements or the interaction relationship between two elements, unless specifically defined otherwise. For those of ordinary skill in the art, the specific meaning of the above terms in the invention can be understood according to specific circumstances.

Figure 2:
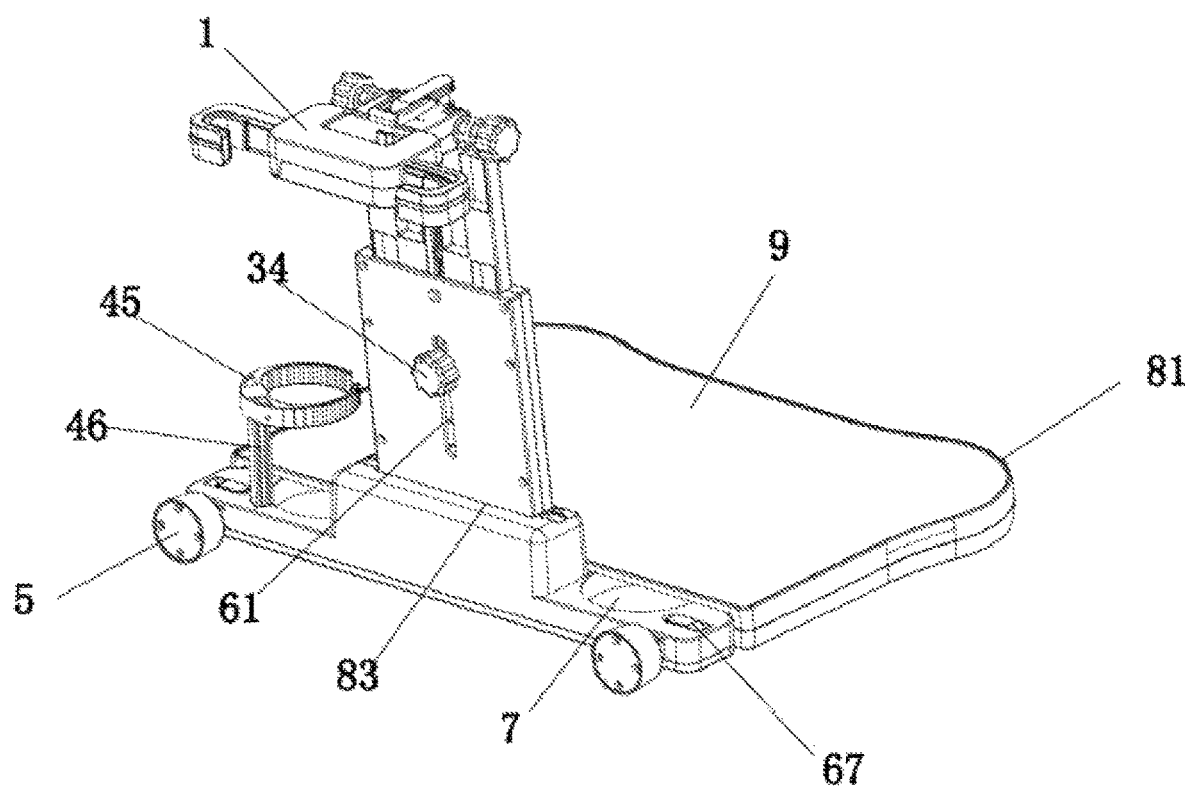
FIG. 2 is a schematic diagram of the back assembly of the invention.

As shown in FIG. 1 and FIG. 2, an auxiliary function board of vehicle seats of the invention, comprising a device main body, wherein the device main body comprises a bottom plate 8 and a supporting plate 9 mounted on the bottom plate 8 in a pull-out manner; the upper end of the supporting plate 9 forms a horizontal placement surface, and the upper end of the bottom plate 8 is provided with a boss 6 on the side away from the supporting plate; a backing plate 4 is mounted on the boss 6 in an overturning manner; a pull-out plate 2 is inserted from top to bottom on the backing plate 4; the pull-out plate 2 is provided with a fixing device 1; the whole device main body is fixedly installed on the two metal rods on the seat back through the fixing device 1; at least two placing cavities 7 of arbitrary shapes are formed on the bottom plate 8 protruding from one end of the supporting plate, and one of the placing cavities 7 is provided with a foldable storage type fixing bracket 10; a functional clamping assembly 3 is rotatably provided on the side of the backing plate 4 opposite to the bottom plate; supporting abutments 5 are also provided on the end surface of the bottom plate 4 on the side facing away from the supporting plate 9; the supporting abutments 5 are mounted in the bottom plate 8 in a pull-out manner, and after being pulled out, they contact and support the back of the seat back.

Figure 9:
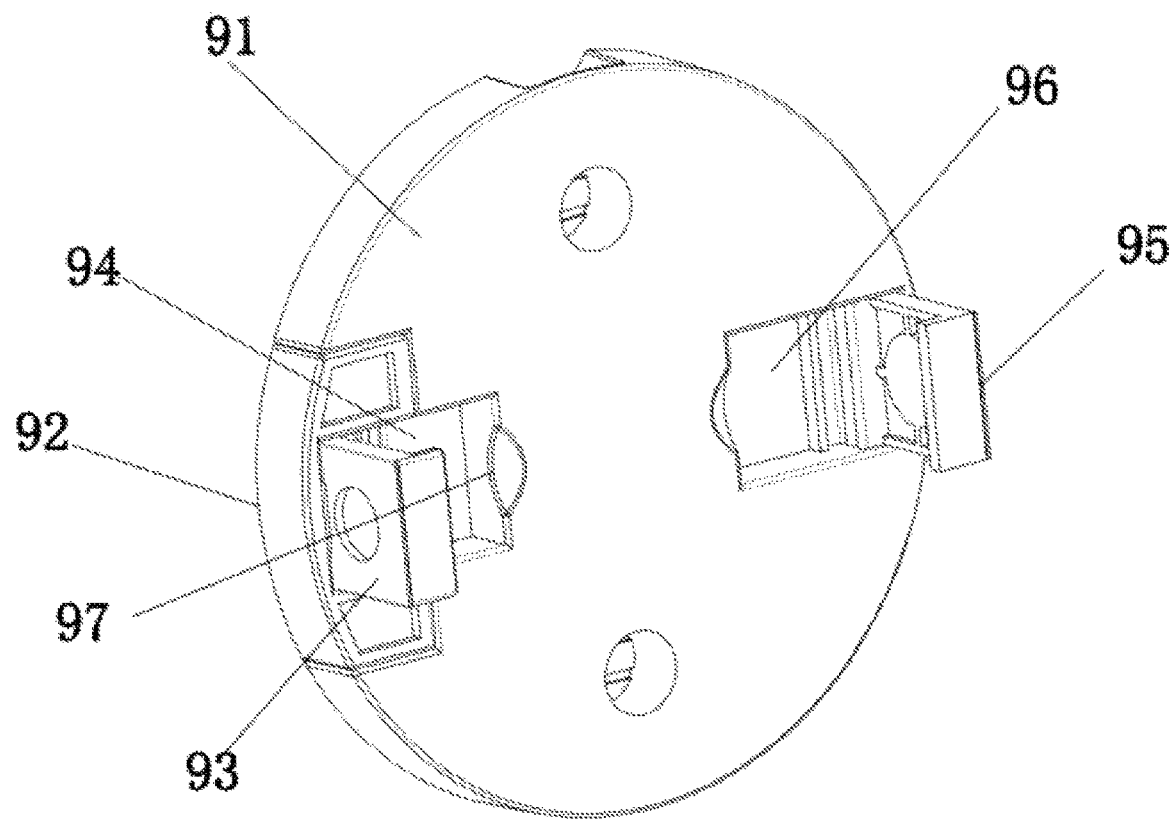
FIG. 9 is a schematic diagram of the structure of the functional clamping assembly according to the invention.

As shown in FIG. 9, the functional clamping assembly 3 comprises a rotating disc 91; a central shaft is provided on the rotating disc 91; the rotating disc is rotatably installed on the backing plate 4 through the central shaft; one side of the rotating disc 91 is opened with an opening groove; a pull-out part 92 is installed in the opening groove; the pull-out part 92 is hinged with a first fixing clip 93; the rotating disc 91 on one side of the first fixing clip 93 is provided with a first receiving groove 94; the rotating disc 91 arranged symmetrically with the first fixing clip 93 is provided with a second fixing clip 95 and a second receiving groove 96; the second fixing clip 95 is hinged in the second receiving groove 96 through a hinge shaft; the first fixing clip 93 and the second fixing clip 95 are respectively buckled into the first receiving groove 94 and the second receiving groove 96 for receiving. When not in use, the fixing clip is buckled into the receiving groove, and when in use, the fixing clip can be opened by buckling into the finger buckle groove, which is convenient for operation.

Figure 10:
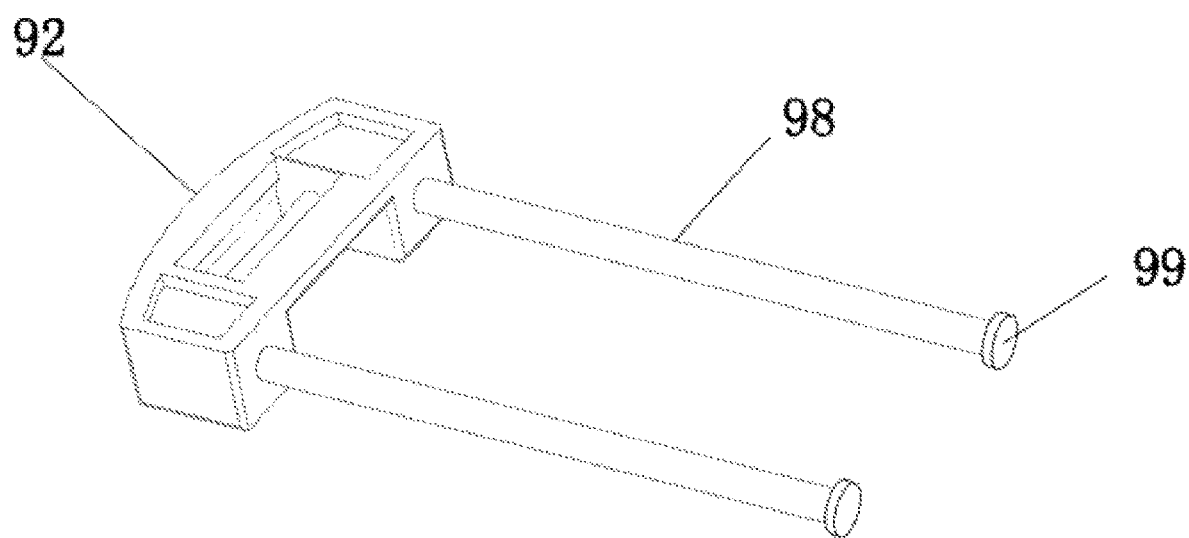
FIG. 10 is a schematic diagram of the structure of the pull-out part according to the invention.

In order to obtain greater flexibility in use, a finger buckle groove 97 is formed on one side of the first receiving groove 94 and the second receiving groove 96; the pull-out 92 is connected with two pull-out rods 98; as shown in FIG. 10, the pull-out rods 98 are installed in the pull-out holes in the rotating disc in a pull-out manner; the tail end of the pull-out rod is provided with a limiting convex part 99; the pull-out rod 98 is fitted with a second spring; one end of the second spring is in contact with the limiting convex part, and the other end thereof is in contact with the limiting edge covering of the opening end of the pull-out hole. The first fixing clip is pulled out through the pull-out part; at this time, the pull-out rod is pulled out, the spring is compressed, and the distance between the first fixing clip and the second fixing clip increases. Mobile phones or tablet computers can be clamped in this space and adjusted arbitrarily. After the clamping is completed, it will be automatically clamped. The entire rotating disc can be rotated and the angle can be adjusted arbitrarily. In order to increase the positioning ability, the rotating central shaft needs to be equipped with a damping element, which can be a silicone sleeve, to increase the friction to realize the positioning ability of the rotating disc.

Figure 3:
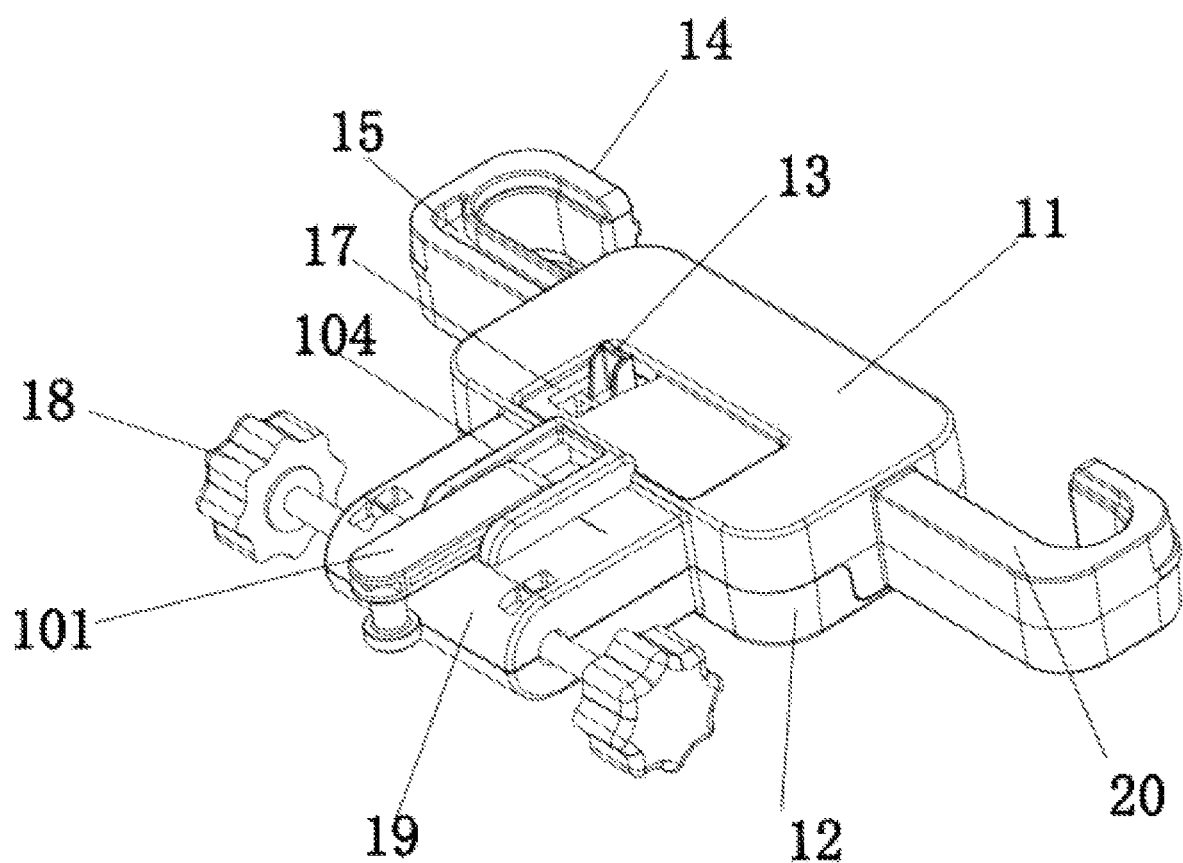
FIG. 3 is a schematic diagram of the front assembly of the fixing device according to the invention.
Figure 4:
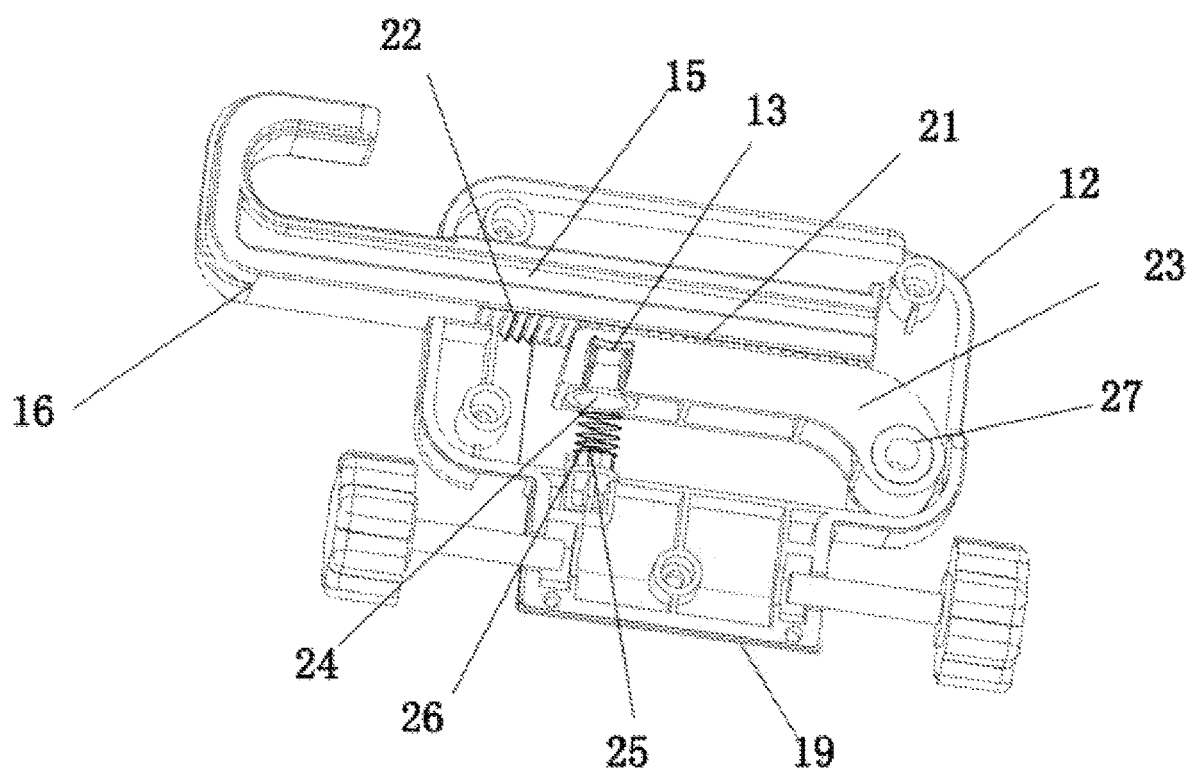
FIG. 4 is an internal schematic diagram of the fixing device according to the invention after being disassembled.

As shown in FIG. 3 and FIG. 4, the fixing device can be any kind of fixing device, as long as it can be fixed on the two metal rods of the vehicle seat. In the embodiment, the fixing device 1 comprises a fixing bottom shell 12 and a fixing surface shell 11; the fixing bottom shell 12 and the fixing surface shell 11 are locked together by screws; the fixing bottom shell 12 is telescopically installed with a movable clamping arm 16, and the bottom of the fixing surface shell 11 is provided with a fixed clamping arm 20 corresponding to the movable clamping arm; one side of the fixing bottom shell 12 is hinged with a compression arm 23, and the compression arm 23 is pressed against the side of the movable clamping arm 16; the two sides of the fixed clamping arm 20 and the movable clamping arm 16 respectively extend to the outside of the fixing bottom shell 12 and the fixing surface shell 11, and the protruding ends respectively form a locking hook 14 for locking the two metal rods on the seat back.

As shown in FIG. 4, the compression arm 23 is provided with a first comb tooth layer 21 on the side opposite to the movable clamping arm; a second comb tooth layer 22 is provided on the movable clamping arm 16 facing the first comb tooth layer 21; the first comb tooth layer 21 and the second comb tooth layer 22 are compressed and positioned by elastic pressing force; the back of the compression arm 23 is provided with a spring positioning hole 24, and a spring positioning column 25 is protrudingly provided on the fixing bottom shell facing the spring positioning hole 24; one end of a first spring 26 is inserted into the spring positioning hole 24, and the other end is positioned and installed on the spring positioning column 25; the compression arm is pressed against the movable clamping arm 16 through the first spring 26; one end of the compression arm 23 is provided with a rotating shaft sleeve 27, and the rotating shaft sleeve 27 is rotatably installed between the fixing surface shell 11 and the fixing bottom shell 12; the top of the compression arm 23 is provided with a toggle key 13; a key slot hole 17 is opened on the fixing surface shell facing the toggle key 13; the toggle key 13 passes through the key slot hole 17 and protrudes to the outside; the first spring 26 is arranged on the side close to the toggle key 13. When you need to adjust the movable clamping arm, you only need to adjust the toggle key so that the pressing force of the movable clamping arm of the compression arm disappears, and the movable clamping arm can be drawn out at this time. After the adjustment is completed, release the toggle key, and the elastic deformation restoring force can be used to achieve the purpose of automatic compression.

As shown in FIG. 4, the upper end surface of the movable clamping arm 16 is provided with a guide rail groove 15; the upper end surface of the fixing surface shell 11 is provided with a guide limiter at a position facing the guide rail groove; the guide limiter is buckled into the guide rail groove 15; the guide limiter ensures that the movable clamping arm can be pulled out more smoothly and can move along the guide rail groove.

Figure 5:
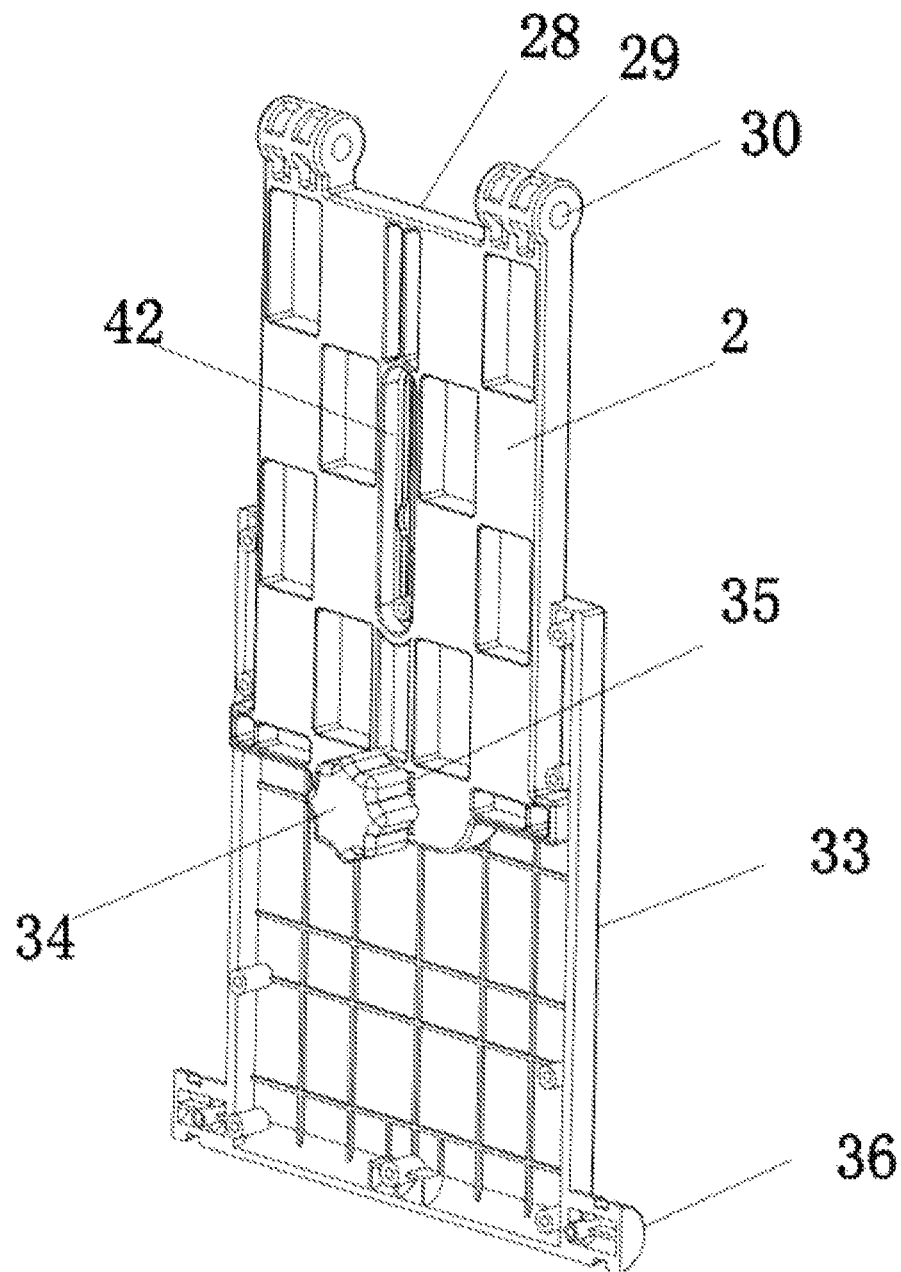
FIG. 5 is a first internal schematic diagram of assembly of the pull-out plate and the backing plate according to the invention.
Figure 6:
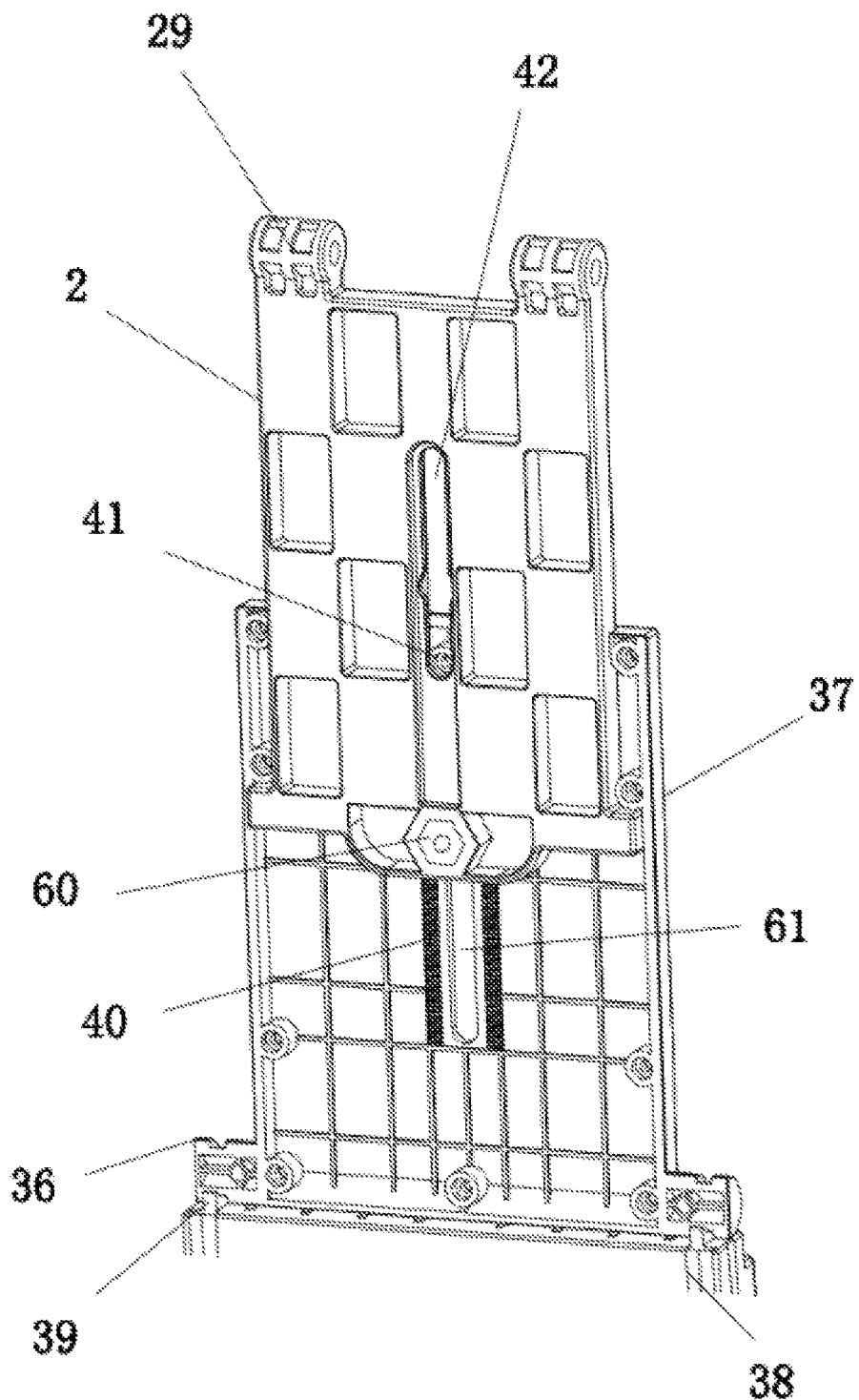
FIG. 6 is a second internal schematic diagram of assembly of the pull-out plate and the backing plate according to the invention.

As shown in FIG. 3, FIG. 5, and FIG. 6, an extension convex part is provided on the fixing bottom shell 12 and the fixing surface shell 11; an assembly concave part 28 is provided on the pull-out plate 2 facing the extension convex part 19; a connecting piece 29 is formed on the pull-out plates 12 on both sides of the assembly concave part 28; the middle of the connecting piece 29 is provided with a through hole 30; a fixing nut is provided in the extension convex part 19; a locking piece 18 is provided on both outsides of the connecting piece 29, and the locking piece 18 comprises a knob part and a screw; the screw passes through the through hole and extends into the extension convex part 19 to be in threaded connection with the fixing nut; the angle between the fixing device 1 and the pull-out plate 2 is positioned by the locking piece 18; the fixing nut is loosened during operation, and the fixing nut is tightened after the position required by the angle value is adjusted.

Figure 7:
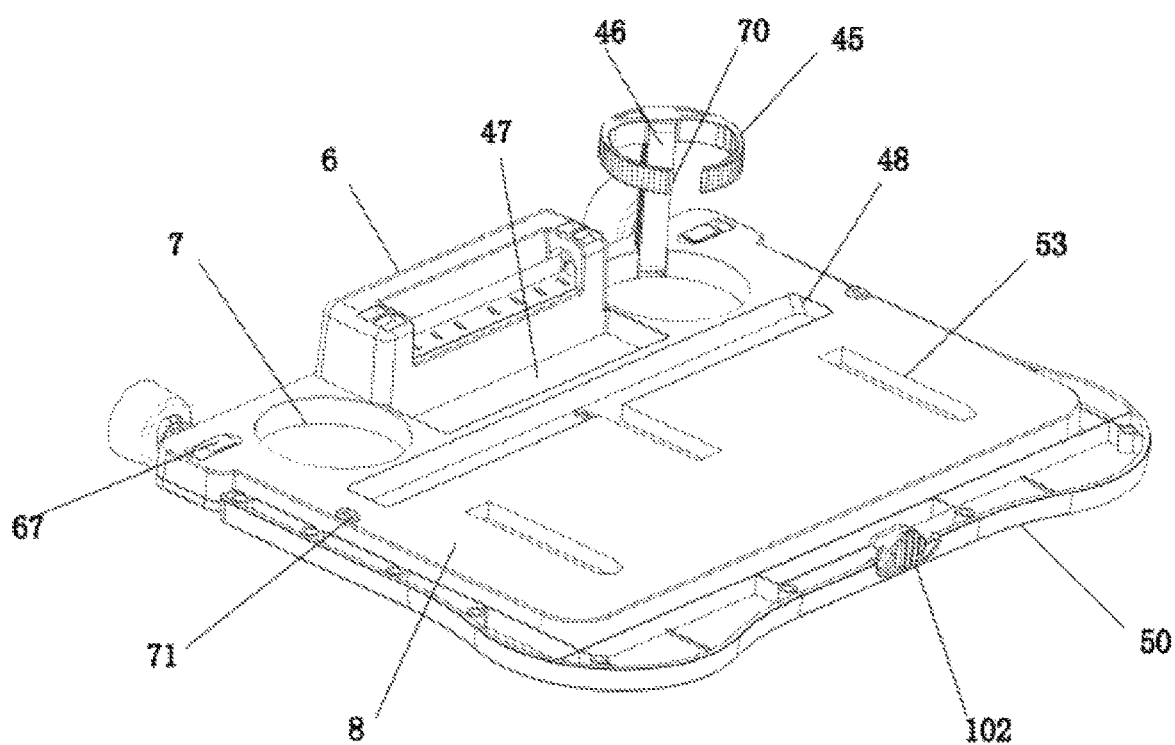
FIG. 7 is a schematic diagram of the disassembly and assembly of the top between the bottom plate and the supporting plate according to the invention.
Figure 8:
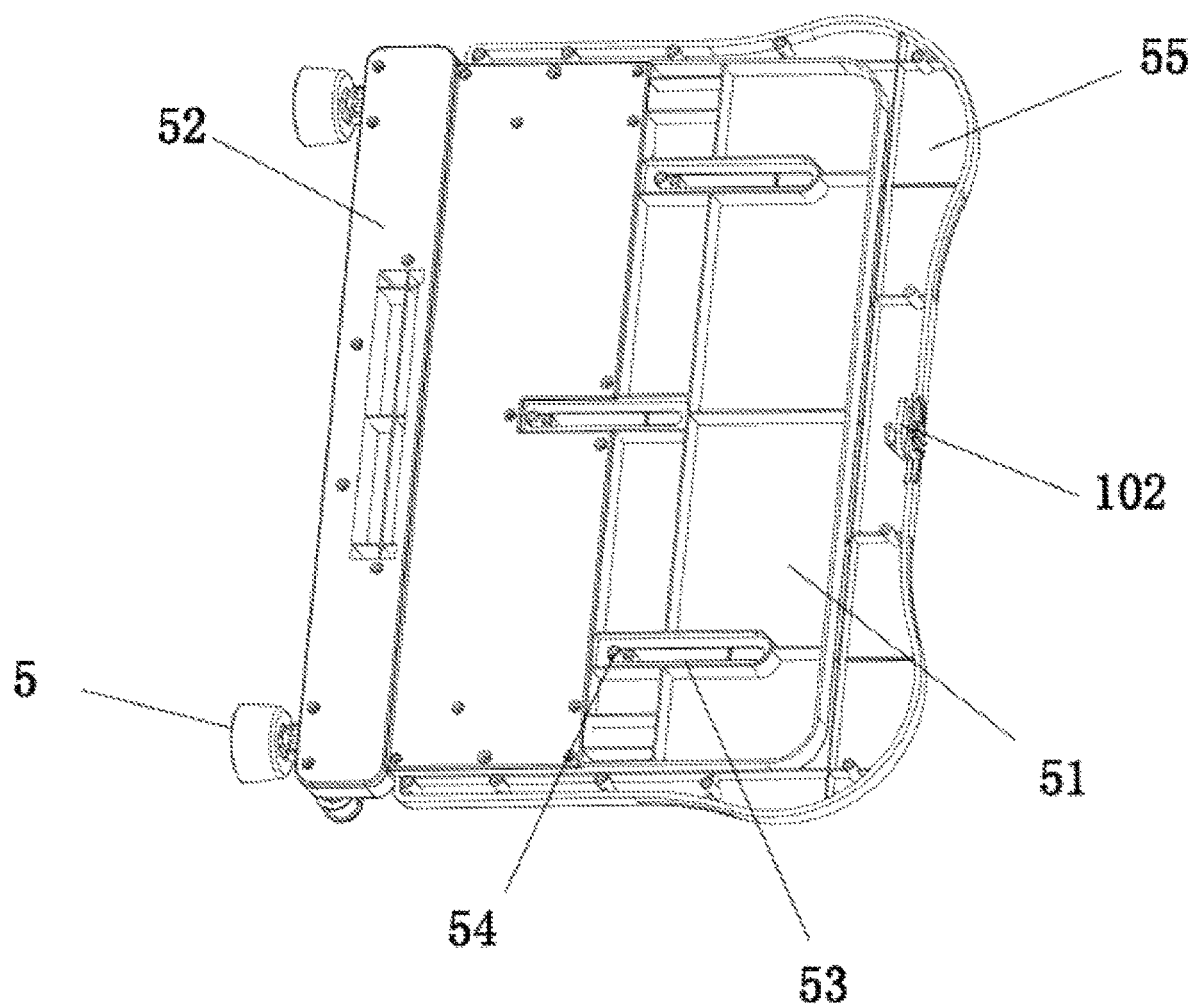
FIG. 8 is a schematic diagram of the disassembly and assembly of the bottom between the bottom plate and the supporting plate according to the invention.

As shown in FIG. 7 and FIG. 8, the bottom plate 8 comprises a bottom plate bottom shell 51 and a bottom plate surface shell 52; the bottom plate bottom shell 51 and the bottom plate bottom shell 52 are fixed to each other by screws; the bottom plate bottom shell 52 is provided with a supporting boss 38; the supporting boss 38 is provided with two half-moon supporting parts 39; each of the half-moon supporting parts 39 is provided with an arc-shaped supporting groove; a rotating shaft 36 on both sides of the bottom of the backing plate 4 is respectively provided with an annular groove; the rotating shaft 36 is rotatably supported in the arc-shaped supporting groove through the annular groove; an inclined supporting surface 83 is formed between one side of the backing plate 4 and the surface of the boss 6; when the backing plate 4 is in contact with one side of the boss 6, the angle between the backing plate 4 and the horizontal plane is greater than 90 degrees. When the backing plate is pulled up for use, since an inclined supporting surface is formed between the backing plate and the boss, a larger field of vision can be obtained during use, which is convenient for users to use office supplies such as tablets.

As shown in FIG. 5 and FIG. 6, the backing plate 4 comprises a backing plate bottom shell 37 and a backing plate surface shell 33; the backing plate bottom shell 37 and the backing plate surface shell 33 are assembled as one by screws; the pull-out plate 2 partially extends into the first pull-out cavity between the backing plate bottom shell 37 and the backing plate surface shell 33; a locking nut 60 is provided in the pull-out plate 2; a first slide rail groove 61 is opened on the backing plate bottom shell 37; a locking fixture 34 is provided outside the backing plate bottom shell 37; the locking screw of the locking fixture 34 passes through the first slide rail groove 61 and is in threaded engagement with the locking nut 60 on the pull-out plate 2; a second slide rail groove 42 is provided on the pull-out plate 2; a limiting convex column 41 is provided on the backing plate bottom shell 37 facing the second slide rail groove 42; the limiting convex column 41 is buckled into the second slide rail groove 42; a sliding positioning structure is also provided on one side of the pull-out plate 2 and the backing plate bottom shell 37.

The sliding positioning structure comprises a third comb tooth layer 40 arranged on the inner surface of the backing plate bottom shell 37 and a fourth comb tooth layer 35 arranged on the pull-out plate 2; the third comb tooth layer 40 and the fourth comb tooth layer 35 are in contact and meshing; the third comb tooth layer 40 and the fourth comb tooth layer 35 are compressed and contacted with each other through the locking between the locking screw and the locking nut 60 to achieve a better positioning effect and prevent random sliding.

Figure 11:
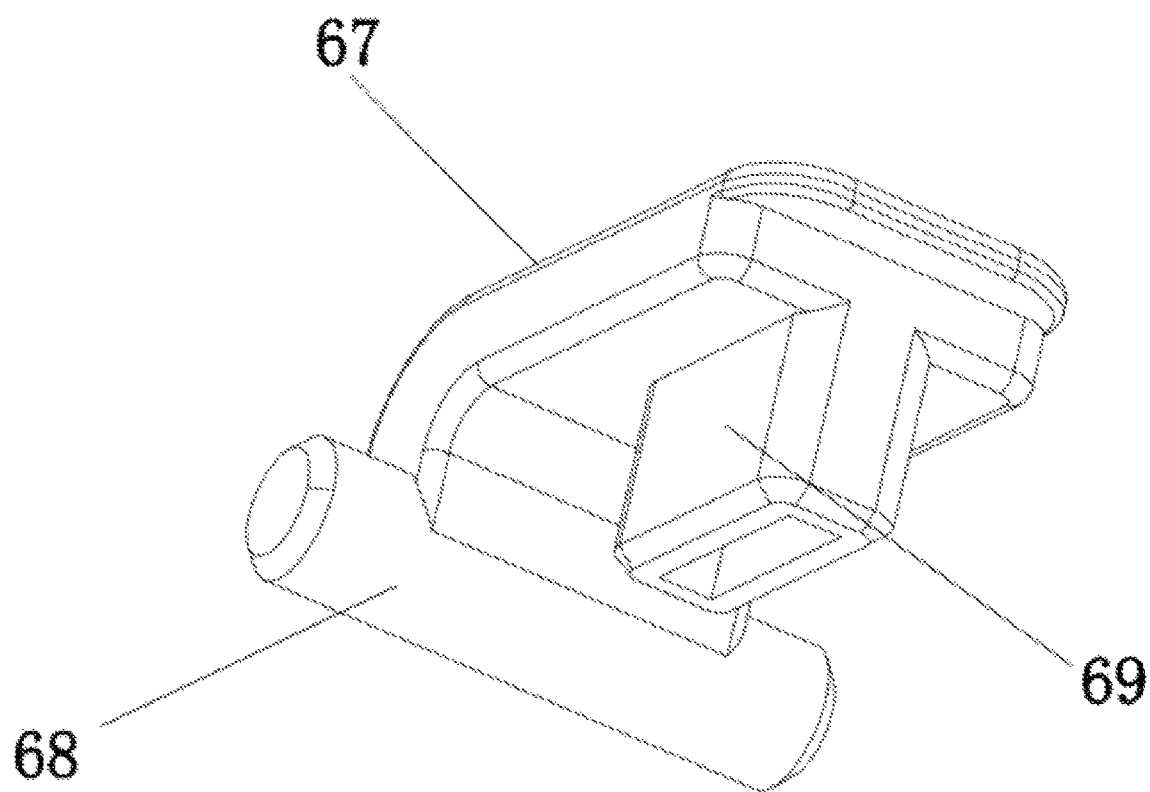
FIG. 11 is a schematic diagram of the structure of the toggle limiter according to the invention.
Figure 12:
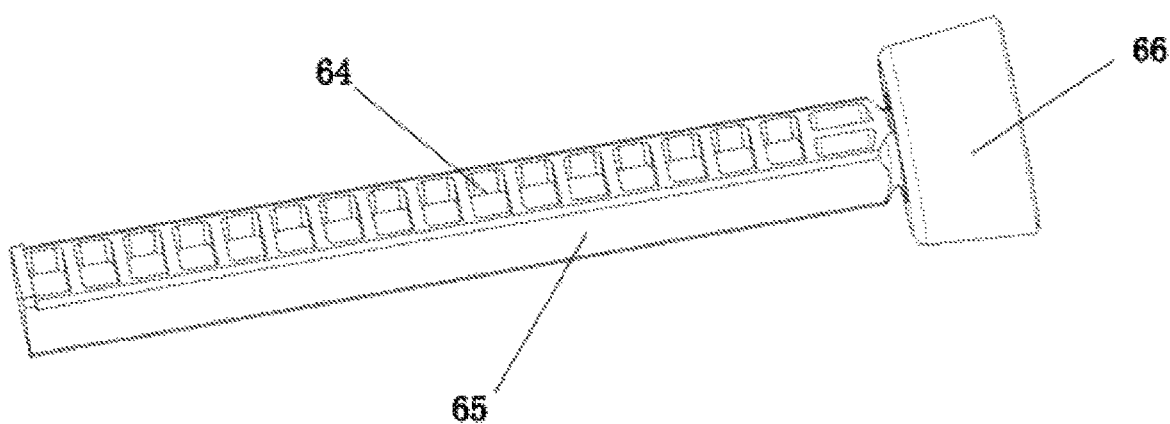
FIG. 12 is a schematic diagram of the structure of the supporting abutment according to the invention.
Figure 15:
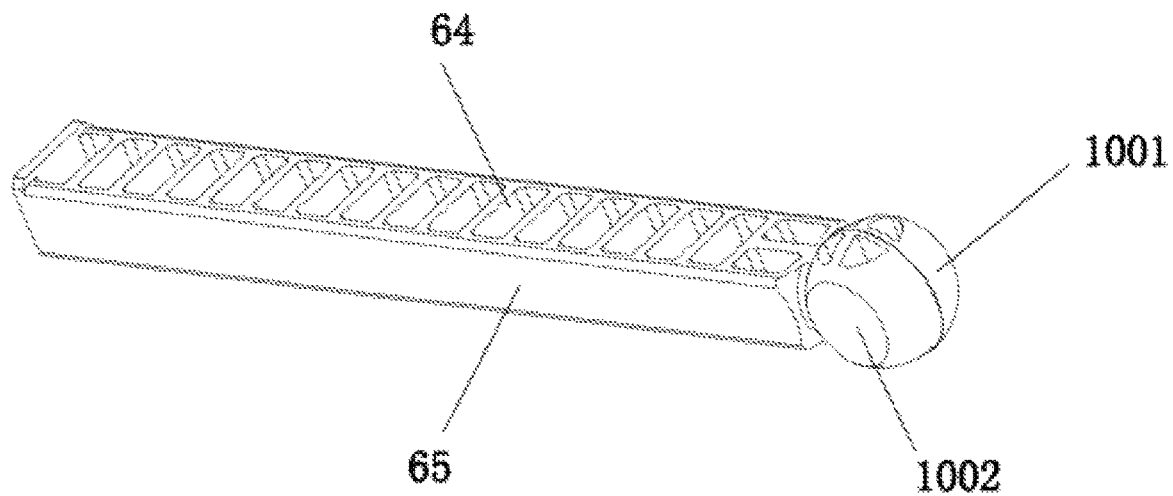
FIG. 15 is a schematic diagram of the structure of the supporting abutment with the widened part removed.

As shown in FIG. 12, the supporting abutment 5 comprises a supporting piece 65 and a widened part 66 provided on the supporting piece 65; the upper end surface of the supporting piece 65 is provided with more than one positioning grooves 65 at equal distances; the upper end of the bottom plate 8 away from the side of the supporting plate is provided with a toggle limiter 67; the bottom of the toggle limiter 67 is provided with a positioning plate 69; the positioning plate 69 is positioned in the positioning groove 64; the toggle limiter is provided with a rotating pin; the rotating pin is rotatably installed in the limiter installation groove provided on the bottom plate, as shown in FIG. 11. After the fixing device is fixed on the vehicle seat, the toggle limiter can be opened upwards, so that the positioning plate of the toggle limiter is separated from the positioning groove, and the supporting piece can be pulled out at this time; after the required length is pulled out, the widened part can be contacted and supported with the back of the seat, so that the whole device is kept horizontal, and the purpose of stable support is achieved; after the adjustment is completed, the positioning plate can be inserted into the corresponding positioning groove In order to gain more degree of freedom, the widened part 66 and the supporting piece 65 are connected by a rotating ball 1001; one end of the rotating ball 1001 is connected to the supporting piece 65; a rotating cavity with the same shape as the rotating ball is provided in the widened part 66; a horizontal plane 1002 is respectively provided on both sides of the rotating ball 1001. Through the rotating ball, the widened part can be rotated up and down relative to the supporting piece, as shown in FIG. 15.

As shown in FIG. 7, the fixing bracket 10 comprises a bracket rod 46 and a fixing sleeve 45 with elastic force; the bottom of the fixing sleeve 45 is provided with a mounting slot; one end of the bracket rod 46 is installed in the mounting slot through the rotation of the pin shaft; an opening 70 is opened on the fixing sleeve facing the bracket rod; the fixing sleeve 45 is provided with a clamping cavity; the inner wall of the fixing sleeve 45 is provided with more than one arc-shaped clamping groove; the bottom of the bracket rod 46 is hinged on the bottom plate 8 on the side of the placing cavity; the bracket rod 46 and the fixing sleeve 45 are buckled into the placing cavity 7 by folding the bracket rod 46 and the fixing sleeve 45. The fixing sleeve can be opened moderately and used to clamp products with different outer diameters. When not in use, the fixing sleeve and the bracket rod can be folded and placed in the placing cavity.

As shown in FIG. 7 and FIG. 8, the supporting plate 9 comprises a supporting plate bottom plate 50 and a supporting plate surface plate 55; the supporting plate bottom plate 50 and the supporting plate surface plate 55 are locked together by screws, and a second pull-out cavity is formed therein; the bottom plate 8 is mounted in the second pull-out cavity in a pull-out manner; the bottom of the supporting plate surface plate 55 is provided with more than one guide sliding blocks 54; a corresponding guide sliding groove 53 is provided on the bottom plate 8 facing the guide sliding block 54; the guide sliding block 54 slides into the guide sliding groove 53; the bottom plate 8 is further provided with a limiting buckle 71 at one end protruding from the outside of the supporting plate; the bottom of the limiting buckle is provided with a supporting spring; the supporting spring pushes the limiting buckle 71 outwards and restricts the side of the supporting plate.

An extension supporting plate 81 is respectively formed on both ends of the supporting plate 9 away from the pull-out plate. The extension supporting plate provided with the arc structure can increase the contact surface of the supporting plate and the elbow when the user use it, so that the user can contact and support more comfortably during use, which is convenient for the user to operate the computer.

As shown in FIG. 7, the upper end surface of the bottom plate 8 is further provided with a first placement groove 47; the first placement groove 47 is located between the two placing cavities 7; a second placement groove 48 is further provided on the bottom plate 8 located on one side of the first placement groove 47. Tablet computers and other items can be placed in the corresponding placement grooves. The top of the computer is in contact with the backing plate to achieve a back support, and then it is convenient to obtain the desired placement angle. A series of other items can also be placed in the placement groove.

Figure 13:
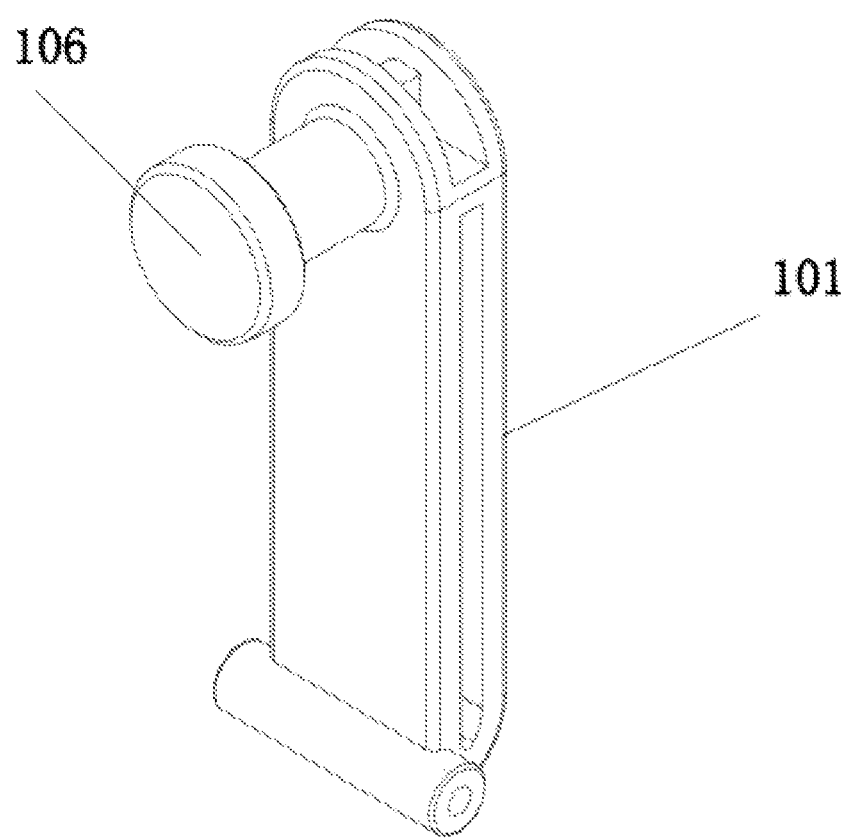
FIG. 13 is a schematic diagram of the structure of the limiting stabilization block according to the invention.

As shown in FIG. 3 and FIG. 13, the fixing device is provided with a guide block 104; the guide block 104 is provided with a U-shaped cavity; a limiting stabilization block 101 is rotatably installed in the U-shaped cavity; the limiting stabilization block 101 is provided with a limiting stabilization part 106; the limiting stabilization part 106 is in "T" shape; a limiting buckle groove is provided on the end surface of the supporting plate on the side away from the boss; a limiting piece 102 is provided in the limiting buckle groove; the limiting piece 102 moves left and right in the limiting buckle groove to fix the limiting stabilization part 106 buckled into the limiting buckle groove.

Figure 14:
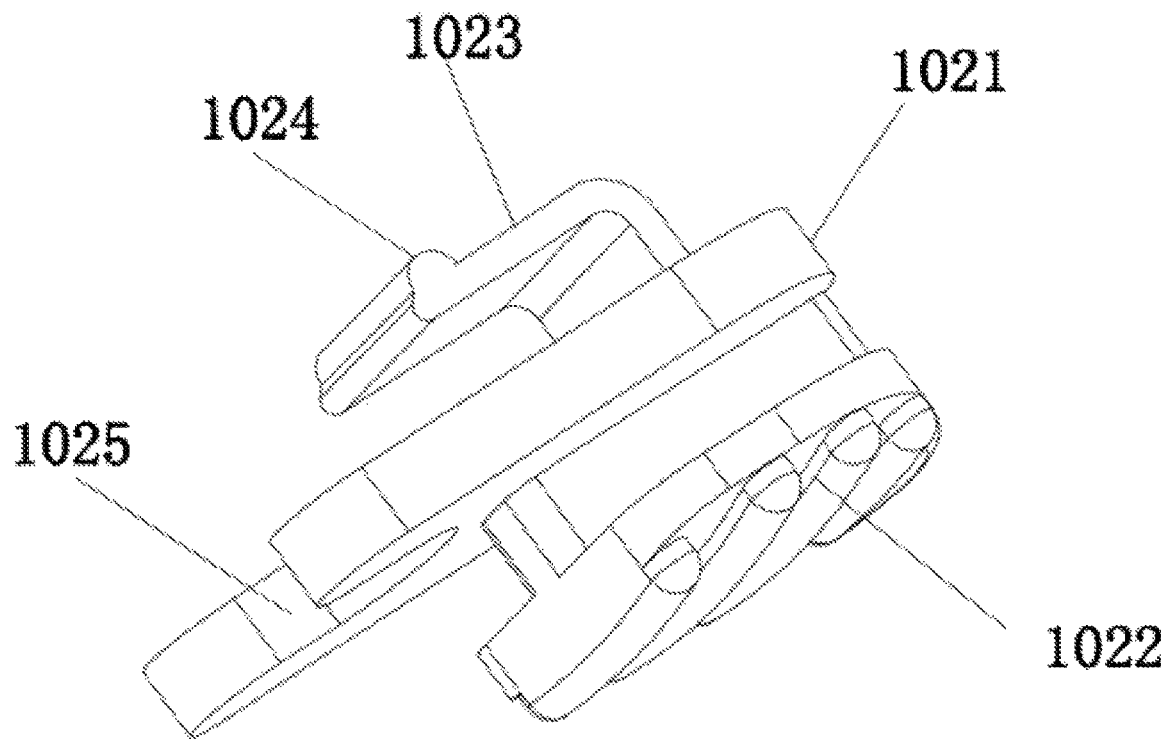
FIG. 14 is a schematic diagram of the structure of the limiting piece according to the invention.

As shown in FIG. 14, the limiting piece 102 comprises a limiting body part 1021; the outer end of the limiting body part 1021 forms a toggle part 1022 with a convex edge; an elastic fastener 1023 is provided on the side of the limiting body part 1021 away from the toggle part 1022; an arc-shaped limiting part 1024 is provided on the elastic fastener 1023; an arc-shaped limiting groove is formed on the bottom plate of the supporting plate; the arc-shaped limiting part on the elastic fastener 1023 is buckled into the arc-shaped limiting groove; the limiting body part 1021 is provided with a U-shaped positioning groove 1025; the U-shaped positioning groove 1025 is used for positioning the T-shaped limiting stabilization part 106.

The limiting buckle groove comprises a buckle hole and a horizontal guide section; the limiting piece 102 is slidably installed in the horizontal guide section; the T-shaped limiting stabilization part 106 is buckled into the buckle hole and positioned by the U-shaped positioning groove 1025 on the limiting body part. When the entire backing plate is folded relative to the supporting plate, the limiting stabilization part is buckled into the limiting buckle groove, and then the limiting stabilization part is prevented from loosening by the limiting piece; at this time, an effective and stable folding is achieved to prevent the backing plate and the supporting plate from opening.

The advantageous effects of the invention are: 1. the supporting plate of the invention is provided with two arc-shaped extension supporting plates, so that when the passenger is operating on the supporting plate, he can contact with hands, which is more in line with ergonomics;

2. the invention is provided with at least two placing cavities, and a fixing bracket can be provided in the placing cavity to fix a series of column-shaped pieces such as tea cups;

3. the supporting plate of the invention can be pulled out, and the length can be adjusted according to the needs; the supporting plate can be used for office or rest, etc;

4. digital products such as tablets can be placed in the placement groove of the invention, and the backing plate is used as the back support, which is convenient for the user to use digital products, and is convenient for office and entertainment;

5. the mobile phone or tablet can be clamped on the functional clamping assembly of the invention; the functional clamping assembly can be rotated at any angle, and can be adjusted according to the size of the product, so the invention has a wide range of use, and is convenient for entertainment operations;

6. the invention adopts a fixing device, which can be adjusted arbitrarily according to the distance between the metal rods of the vehicle seat; therefore, it can be installed on any vehicle seat, the installation is more flexible, and it can be fitted with the supporting abutments to make the whole device more stable when it is fixed on the back of the vehicle seat;

7. the invention is adjustable in height, foldable for storage, has a small volume after storage, is convenient to carry and install, and the overall use function is greatly improved.

The above are only specific implementations of the invention, but the protection scope of the invention is not limited thereto. Any changes or substitutions that are not thought of through creative work shall be covered by the protection scope of the invention. Therefore, the protection scope of the invention should be subject to the protection scope defined by the claims.

What is claimed is:

1. An auxiliary function board of vehicle seats, comprising a device main body, wherein the device main body comprises a bottom plate (8) and a supporting plate (9) mounted on the bottom plate (8) in a pull-out manner; an upper end of the supporting plate (9) forms a horizontal placement surface, and the upper end of the bottom plate (8) is provided with a boss (6) on a side away from the supporting plate; a backing plate (4) is mounted on the boss (6) in an overturning manner; a pull-out plate (2) is inserted from top to bottom on the backing plate (4); the pull-out plate (2) is provided with a fixing device (1); a whole device main body is fixedly installed on two metal rods on a seat back through the fixing device (1); at least two placing cavities (7) of arbitrary shapes are formed on the bottom plate (8) protruding from one end of the supporting plate, and one of the placing cavities (7) is provided with a foldable storage type fixing bracket (10); a functional clamping assembly (3) is rotatably provided on a side of the backing plate (4) opposite to the bottom plate; supporting abutments (5) are also provided on an end surface of the bottom plate (4) on a side facing away from the supporting plate (9); the supporting abutments (5) are mounted in the bottom plate (8) in a pull-out manner, they contact and support the back of the seat back.

2. The auxiliary function board of vehicle seats according to claim 1, wherein the fixing device (1) comprises a fixing bottom shell (12) and a fixing surface shell (11); the fixing bottom shell (12) and the fixing surface shell (11) are locked together by screws; the fixing bottom shell (12) is telescopically installed with a movable clamping arm (16), and the bottom of the fixing surface shell (11) is provided with a fixed clamping arm (20) corresponding to the movable clamping arm; one side of the fixing bottom shell (12) is hinged with a compression arm (23), and the compression arm (23) is pressed against the side of the movable clamping arm (16); two sides of the fixed clamping arm (20) and the movable clamping arm (16) respectively extend to an outside of the fixing bottom shell (12) and the fixing surface shell (11).

3. The auxiliary function board of vehicle seats according to claim 2, wherein the compression arm (23) is provided with a first comb tooth layer (21) on the side opposite to the movable clamping arm; a second comb tooth layer (22) is provided on the movable clamping arm (16) facing the first comb tooth layer (21); the first comb tooth layer (21) and the second comb tooth layer (22) are compressed and positioned by elastic pressing force; the back of the compression arm (23) is provided with a spring positioning hole (24), and a spring positioning column (25) is protrudingly provided on the fixing bottom shell facing the spring positioning hole (24); one end of a first spring (26) is inserted into the spring positioning hole (24), and the other end is positioned and installed on the spring positioning column (25); the compression arm is pressed against the movable clamping arm (16) through the first spring (26); one end of the compression arm (23) is provided with a rotating shaft sleeve (27), and the rotating shaft sleeve (27) is rotatably installed between the fixing surface shell (11) and the fixing bottom shell (12); the top of the compression arm (23) is provided with a toggle key (13); a key slot hole (17) is opened on the fixing surface shell facing the toggle key (13); the toggle key (13) passes through the key slot hole (17) and protrudes to the outside; the first spring (26) is arranged on the side close to the toggle key (13).

4. The auxiliary function board of vehicle seats according to claim 2, wherein an extension convex part is provided on the fixing bottom shell (12) and the fixing surface shell (11); an assembly concave part (28) is provided on the pull-out plate (2) facing the extension convex part (19); a connecting piece (29) is formed on the pull-out plates (12) on both sides of the assembly concave part (28); the middle of the connecting piece (29) is provided with a through hole (30); a fixing nut is provided in the extension convex part (19); a locking piece (18) is provided on both outsides of the connecting piece (29), and the locking piece (18) comprises a knob part and a screw; the screw passes through the through hole and extends into the extension convex part (19) to be in threaded connection with the fixing nut; the angle between the fixing device (1) and the pull-out plate (2) is positioned by the locking piece (18); the fixing nut is loosened during operation, and the fixing nut is tightened after the position required by the angle value is adjusted.

5. The auxiliary function board of vehicle seats according to claim 1, wherein the functional clamping assembly (3) comprises a rotating disc (91); a central shaft is provided on the rotating disc (91); the rotating disc is rotatably installed on the backing plate (4) through the central shaft; one side of the rotating disc (91) is opened with an opening groove; a pull-out part (92) is installed in the opening groove; the pull-out part (92) is hinged with a first fixing clip (93); the rotating disc (91) on one side of the first fixing clip (93) is provided with a first receiving groove (94); the rotating disc (91) arranged symmetrically with the first fixing clip (93) is provided with a second fixing clip (95) and a second receiving groove (96); the second fixing clip (95) is hinged in the second receiving groove (96) through a hinge shaft; the first fixing clip (93) and the second fixing clip (95) are respectively buckled into the first receiving groove (94) and the second receiving groove (96).

6. The auxiliary function board of vehicle seats according to claim 5, wherein a finger buckle groove (97) is formed on one side of the first receiving groove (94) and the second receiving groove (96); the pull-out (92) is connected with two pull-out rods (98); the pull-out rods (98) are installed in the pull-out holes in the rotating disc in a pull-out manner; the tail end of the pull-out rod is provided with a limiting convex part (99); the pull-out rod (98) is fitted with a second spring; one end of the second spring is in contact with the limiting convex part, and the other end thereof is in contact with the limiting edge covering of the opening end of the pull-out hole.

7. The auxiliary function board of vehicle seats according to claim 1, wherein the bottom plate (8) comprises a bottom plate bottom shell (51) and a bottom plate surface shell (52); the bottom plate bottom shell (51) and the bottom plate bottom shell (52) are fixed to each other by screws; the bottom plate bottom shell (52) is provided with a supporting boss (38); the supporting boss (38) is provided with two half-moon supporting parts (39); each of the half-moon supporting parts (39) is provided with an arc-shaped supporting groove; an inclined supporting surface (83) is formed between one side of the backing plate (4) and the surface of the boss (6); when the backing plate (4) is in contact with one side of the boss (6), the angle between the backing plate (4) and the horizontal plane is greater than 90 degrees.

8. The auxiliary function board of vehicle seats according to claim 1, wherein the backing plate (4) comprises a backing plate bottom shell (37) and a backing plate surface shell (33); the backing plate bottom shell (37) and the backing plate surface shell (33) are assembled as one by screws; the pull-out plate (2) partially extends into a first pull-out cavity between the backing plate bottom shell (37) and the backing plate surface shell (33); a locking nut (60) is provided in the pull-out plate (2); a first slide rail groove (61) is opened on the backing plate bottom shell (37); a locking fixture (34) is provided outside the backing plate bottom shell (37); the locking screw of the locking fixture (34) passes through the first slide rail groove (61) and is in threaded engagement with the locking nut (60) on the pull-out plate (2); a second slide rail groove (42) is provided on the pull-out plate (2); a limiting convex column (41) is provided on the backing plate bottom shell (37) facing the second slide rail groove (42); the limiting convex column (41) is buckled into the second slide rail groove (42); a sliding positioning structure is also provided on one side of the pull-out plate (2) and the backing plate bottom shell (37).

9. The auxiliary function board of vehicle seats according to claim 8, wherein the sliding positioning structure comprises a third comb tooth layer (40) arranged on the inner surface of the backing plate bottom shell (37) and a fourth comb tooth layer (35) arranged on the pull-out plate (2); the third comb tooth layer (40) and the fourth comb tooth layer (35) are in contact and meshing; the third comb tooth layer (40) and the fourth comb tooth layer (35) are compressed and contacted with each other through the locking between the locking screw and the locking nut (60).

10. The auxiliary function board of vehicle seats according to claim 1, wherein the supporting abutment (5) comprises a supporting piece (65) and a widened part (66) provided on the supporting piece (65); the upper end surface of the supporting piece (65) is provided with more than one positioning grooves (65) at equal distances; the upper end of the bottom plate (8) away from the side of the supporting plate is provided with a toggle limiter (67); the bottom of the toggle limiter (67) is provided with a positioning plate (69); the positioning plate (69) is positioned in the positioning groove (64); the toggle limiter is provided with a rotating pin; the rotating pin is rotatably installed in a limiter installation groove provided on the bottom plate.

11. The auxiliary function board of vehicle seats according to claim 10, wherein the widened part (66) and the supporting piece (65) are connected by a rotating ball (1001); one end of the rotating ball (1001) is connected to the supporting piece (65); a rotating cavity with the same shape as the rotating ball is provided in the widened part (66); a horizontal plane (1002) is respectively provided on both sides of the rotating ball (1001).

12. The auxiliary function board of vehicle seats according to claim 1, wherein the fixing bracket (10) comprises a bracket rod (46) and a fixing sleeve (45) with elastic force; the bottom of the fixing sleeve (45) is provided with a mounting slot; one end of the bracket rod (46) is installed in the mounting slot through the rotation of the pin shaft; an opening (70) is opened on the fixing sleeve facing the bracket rod; the fixing sleeve (45) is provided with a clamping cavity; the inner wall of the fixing sleeve (45) is provided with more than one arc-shaped clamping groove; the bottom of the bracket rod (46) is hinged on the bottom plate (8) on the side of the placing cavity; the bracket rod (46) and the fixing sleeve (45) are buckled into the placing cavity (7) by folding the bracket rod (46) and the fixing sleeve (45).

13. The auxiliary function board of vehicle seats according to claim 1, wherein the supporting plate (9) comprises a supporting plate bottom plate (50) and a supporting plate surface plate (55); the supporting plate bottom plate (50) and the supporting plate surface plate (55) are locked together by screws, and a second pull-out cavity is formed therein; the bottom plate (8) is mounted in the second pull-out cavity in a pull-out manner; the bottom of the supporting plate surface plate (55) is provided with more than one guide sliding blocks (54); a corresponding guide sliding groove (53) is provided on the bottom plate (8) facing the guide sliding block (54); the guide sliding block (54) slides into the guide sliding groove (53); the bottom plate (8) is further provided with a limiting buckle (71) at one end protruding from the outside of the supporting plate; the bottom of the limiting buckle is provided with a supporting spring; the supporting spring pushes the limiting buckle (71) outwards and restricts the side of the supporting plate.

14. The auxiliary function board of vehicle seats according to claim 13, wherein an extension supporting plate (81) is respectively formed on both ends of the supporting plate (9) away from the pull-out plate.

15. The auxiliary function board of vehicle seats according to claim 1, wherein the upper end surface of the bottom plate (8) is further provided with a first placement groove (47); the first placement groove (47) is located between the two placing cavities (7); a second placement groove (48) is further provided on the bottom plate (8) located on one side of the first placement groove (47).

16. The auxiliary function board of vehicle seats according to claim 1, wherein the fixing device is provided with a guide block (104); the guide block (104) is provided with a U-shaped cavity; a limiting stabilization block (101) is rotatably installed in the U-shaped cavity; the limiting stabilization block (101) is provided with a limiting stabilization part (106); the limiting stabilization part (106) is in "T" shape; a limiting buckle groove is provided on the end surface of the supporting plate on a side away from the boss; a limiting piece (102) is provided in the limiting buckle groove.

17. The auxiliary function board of vehicle seats according to claim 16, wherein the limiting piece (102) comprises a limiting body part (1021); the outer end of the limiting body part (1021) forms a toggle part (1022) with a convex edge; an elastic fastener (1023) is provided on the side of the limiting body part (1021) away from the toggle part (1022); an arc-shaped limiting part (1024) is provided on the elastic fastener (1023); an arc-shaped limiting groove is formed on the bottom plate of the supporting plate; the arc-shaped limiting part on the elastic fastener (1023) is buckled into the arc-shaped limiting groove; the limiting body part (1021) is provided with a U-shaped positioning groove (1025); the U-shaped positioning groove (1025) is used for positioning the T-shaped limiting stabilization part (106).

18. The auxiliary function board of vehicle seats according to claim 16, wherein the limiting buckle groove comprises a buckle hole and a horizontal guide section; the limiting piece (102) is slidably installed in the horizontal guide section; the T-shaped limiting stabilization part (106) is buckled into the buckle hole and positioned by the U-shaped positioning groove (1025) on the limiting body part.

\* \* \* \* \*